R. BOWLES.
CLUTCH OPERATING MECHANISM FOR HOISTING DRUMS.
APPLICATION FILED MAR. 28, 1918.
1,292,691.
Patented Jan. 28, 1919.
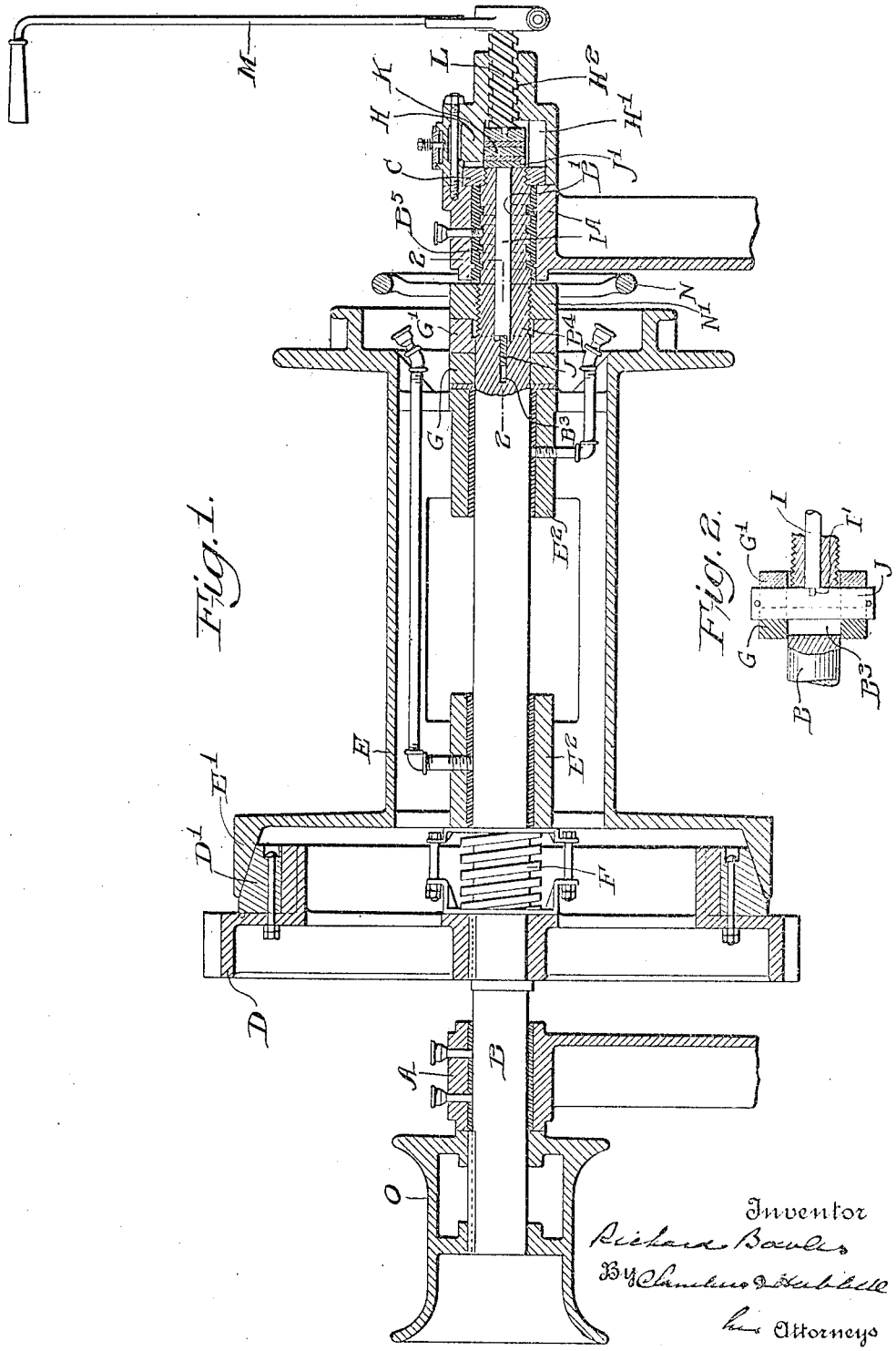

UNITED STATES PATENT OFFICE.

RICHARD BOWLES, OF STROUDSBURG, PENNSYLVANIA.

CLUTCH-OPERATING MECHANISM FOR HOISTING-DRUMS.

1,292,691.   Specification of Letters Patent.   Patented Jan. 28, 1919.

Application filed March 28, 1918. Serial No. 225,179.

*To all whom it may concern:*

Be it known that I, RICHARD BOWLES, a citizen of the United States of America, residing in Stroudsburg, county of Monroe, State of Pennsylvania, have invented certain new and useful Improvements in Clutch-Operating Mechanism for Hoisting-Drums, of which the following is a true and exact description, reference being had to the accompanying drawings, which form a part thereof.

My invention relates to hoisting engines of the type in which the hoisting drum is clutch engaged to a positively rotating shaft of the type in which the drum is shifted to clutch engaging position by means attached to the frame of the engine.

As heretofore generally constructed, engines of this kind have had a recognized defect in that at some point in the mechanism holding the drum in actuating relation with the clutch considerable friction is necessarily involved and it is the object of my invention to provide a simple and efficient device to overcome this defect, which I do by providing in addition to clutch actuating mechanism attached to the frame a clamping nut and hand wheel screwing on the shaft by which the clutch can be held in operative position.

The nature of my improvements will be best understood as described in connection with the drawings in which it is illustrated, and in which—

Figure 1 is a sectional elevation of a portion of a hoisting engine involving my improvement, and Fig. 2 is a detailed view taken on the section line 2—2 of Fig. 1.

A A indicate the bearings for the shaft, which bearings form part of the machine frame. B is the shaft, having a perforation B′ formed through one end of it and connecting with the slot B³ formed through the shaft. The shaft is also formed with an externally threaded portion B⁴ formed on the same end of the shaft through which the perforation extends, and lying inside of the bearing B⁵, which, as shown, is formed with corrugations for the reception of Babbitt metal. C is a collar screwed on the end of the shaft. D is a gear wheel secured to the shaft, and through which the shaft is driven, and D′ a clutch member which, as shown, is secured to the gear wheel D. E is the hoisting drum of the machine, formed as shown with a clutch member E′, and with hub sections E², which are journaled on the shaft B free to move longitudinally thereon. F is a spring which normally keeps the clutch members E′ and D′ in disengaged position. G and G′ are thrust collars journaled on the shaft B, the inner one abutting against the hub of the drum as shown. H is an attachment secured to the frame as shown, and formed with a chamber H′ and a threaded perforation H² leading into said chamber. I is a thrust pin located in the perforation of the shaft, and having its inner end abutted against the cross key J, which extends through the slot B³ in the shaft and engages the thrust collars G and G′. The pin I is shown in Fig. 2 as having a terminal projection I′ which enters a perforation in the edge of the cross key J. As shown, J′ is a plate secured to the outer end of the thrust pin, and K indicates a series of friction plates located between the plate J′ and the screw L, which screws into the perforation H² and is actuated by a hand lever M. N is the threaded hub of the hand wheel N′, which screws upon the threaded portion B⁴ of the shaft and abuts against the thrust collar G′, and O is a winch head secured to the end of the shaft B.

When it is desired to engage the clutch members E′ and D′ and couple the hoisting drum to the shaft, the operator moves the lever M actuating the screw L, which, acting against the friction plates K, thrusts the thrust pin I against the cross key J. The ends of the key acting against the thrust collar G force said collar against the hub of the drum, and thrust the drum and the clutch member attached to it into operative contact with the clutch member D′ coupling the drum to the shaft.

As heretofore generally constructed, the clutch was held in engaged position by the continued action of the lever M and screw L, and with consequent and large development of friction in the friction plates K. In my new construction, however, the clutch having been engaged, the operator turns the clamping wheel N′, forcing its hub against the thrust collar G′, which, acting through the collar G and the hub of the drum, clamps the clutch in operative position, and permits pressure to be relaxed on the friction plates K, thus enabling the engine to operate without development of injurious friction.

When it is desired to release the clutch this is conveniently done by operating the lever M to cause the pin I and key J to press against the collar G, and through it on the end of the drum, and then a slight turn of the hand wheel N and its clamping nut hub N' will retract it on the threaded end of the shaft so that the clutch will be released when the lever M is moved back.

It will be understood that the described apparatus is shown by me as being the best form in which I have embodied my invention, but that it is capable of very considerable modification in detail.

Having now described my invention, what I claim as new and desire to secure by Letters Patent, is:

1. In a hoisting engine having a positively driven shaft supported on two bearings and having an externally threaded portion near and on the inner side of one bearing, a hoisting drum journaled on and longitudinally movable along said shaft, and a clutch for engaging the shaft and drum when the drum is moved in one direction, means attached to the engine frame for moving the drum to clutch engaging position, a clamping nut screwing on the externally threaded portion of the shaft for holding the drum in engaged position and a hand wheel for actuating the nut.

2. In a hoisting engine a shaft having one end centrally perforated and formed with a slot extending through it at or near the end of the perforation, and an externally threaded portion located inside the shaft bearing, said shaft being positively driven and having a clutch member attached to it, in combination with a hoisting drum journaled on said shaft, and having a clutch member attached to it, a cross key extending through the slot in the shaft and arranged when thrust backward to move the drum to clutch engaging position, a thrust pin extending through the perforation of the shaft and acting against the cross key, means attached to the engine frame for acting on the thrust pin, and a clamping wheel screwing on the threaded portion of the shaft and arranged to hold the drum in clutch engaging position.

RICHARD BOWLES.